(12) United States Patent
Wolfe et al.

(10) Patent No.: US 6,431,827 B1
(45) Date of Patent: Aug. 13, 2002

(54) BUCKET TIP BRUSH SEALS IN STEAM TURBINES AND METHODS OF INSTALLATION

(75) Inventors: Christopher Edward Wolfe, Niskayuna; Norman Arnold Turnquist, Sloansville; Frederick George Baily, Ballston Spa; David Robert Skinner, Pattersonville, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/741,742

(22) Filed: Dec. 21, 2000

(51) Int. Cl.[7] ................................................ F01D 11/08
(52) U.S. Cl. .............................. 415/173.3; 415/173.5; 415/174.5; 29/888.3
(58) Field of Search ....................... 415/173.3, 173.5, 415/174.2, 174.5, 230, 231; 29/509, 888.3; 277/355

(56) References Cited

U.S. PATENT DOCUMENTS

| | | | |
|---|---|---|---|
| 5,110,033 A | | 5/1992 | Nonne et al. |
| 5,568,931 A | * | 10/1996 | Tseng et al. .................. 277/53 |
| 5,749,584 A | | 5/1998 | Skinner et al. |
| 5,961,280 A | * | 10/1999 | Turnquist et al. ........ 415/174.3 |

* cited by examiner

Primary Examiner—Edward K. Look
Assistant Examiner—James M McAleenan
(74) Attorney, Agent, or Firm—Nixon & Vanderhye

(57) ABSTRACT

A diaphragm has an annular groove formed of deep and shallow grooves with the deep groove opening into the shallow groove. A combination spill strip/brush seal is disposed in the groove. The brush seal comprises a pair of flexible bars secured to the proximal ends of the brush bristles by welding and is received in the shallow groove and a recess in an axial face of the spill strip. The spill strip has base portions extending into the deep groove. The combination spill strip/brush seal is secured in the annular groove by peening material of the diaphragm into the spill strip/ brush seal combination. The brush seal may be used with different diameters of spill strips and diaphragm grooves.

13 Claims, 3 Drawing Sheets

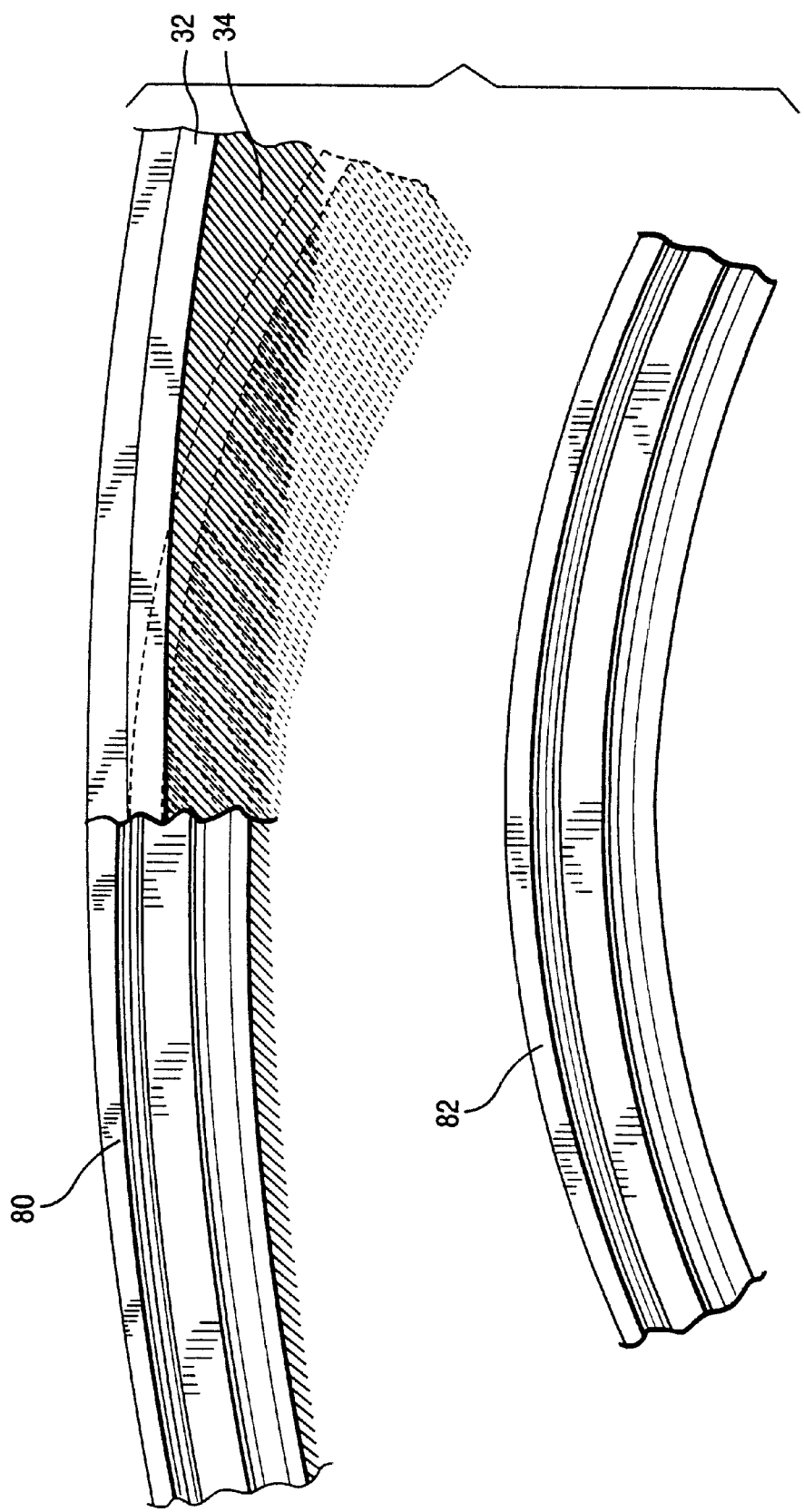

BUCKET TIP BRUSH SEALS IN STEAM TURBINES AND METHODS OF INSTALLATION

BACKGROUND OF THE INVENTION

The present invention relates to seals between turbine bucket covers and casings surrounding the bucket covers and particularly relates to combination brush/labyrinth seals for securement to casings and engaging steam turbine bucket covers.

Brush seals are typically used to minimize leakage through the gap between stationary and rotating components, for example, between high and low pressure regions on opposite sides of the seal. Brush seals are typically formed by disposing a plurality of metal or ceramic bristles between a pair of backing plates typically secured to one component of the seal. The bristles have tips which extend beyond the margins of the backing plates for engagement with the other seal component, e.g., the rotating component. Thus, in a steam turbine where a stationary component receives a shaft, the brush seal is typically secured in a groove formed along an inside diameter of the stationary component, with the backing plates and bristles projecting radially inwardly toward the shaft. The bristle tips project beyond the inside diameter of the backing plates and the bristles form a seal with the rotating shaft.

For original equipment, the brush seal is custom-manufactured for fit with the stationary component. Thus, the backing plates are normally formed as annular rings with the bristles disposed between the rings and secured thereto. The annular ring is, of course, formed to the desired diameter. The ring and brush seals are then cut into brush seal segments for fit into the stationary component. Typically, a number of such segments (e.g., six to twelve for shaft seals, between eight to twenty-six segments for tip seals) are arranged in a stationary component, e.g., in a casing or diaphragm appendage about the tips of buckets in a steam turbine. The manufacturing cycle time, however, is substantial as the brush seals are made for and to a specific diameter and require substantial lead time for manufacturing purposes. Also, the brush seal, when used in conjunction with new packing rings, may have the brush seal backing plate machined integrally with the new packing ring. Where the brush seal, however, is used as a tip spill that is inserted directly into the diaphragm, the backing plate cannot be machined into the existing diaphragm. In all these cases, the brush seal requires custom manufacture to a specific diameter and cannot be used for other and different diameters. Accordingly, there is a need for a combined brush/labyrinth seal which can reduce manufacturing time by avoiding custom-fitting of the brush seal and facilitate retrofit of brush seals in existing casings or diaphragms, for example, in steam turbines for sealing with bucket covers.

BRIEF SUMMARY OF THE INVENTION

In accordance with a preferred embodiment of the present invention, there is provided a brush seal insert formed of a plurality of metal or ceramic bristles disposed between a pair of mounting elements, e.g., flexible bars. Particularly, the bars are flexible in the direction of bending about an axis in which the bars and bristles and, hence, the brush seal, will be situate. The bars and bristles are therefore flexible to various diameters over a wide range of diameters. This is in contrast to conventional brush seals employing backing plates dimensionally thick in the direction of bending which cannot readily be bent to accommodate different diameters of brush seals. Thus, the brush seal portion, i.e., insert, of the combined brush/labyrinth seal can be manufactured ahead of any need for the brush/labyrinth seal combination over a wide range of diameters. This minimizes the manufacturing cycle time when an actual need for a new brush seal arises, e.g., for retrofitting a combination brush/labyrinth seal into a diaphragm.

In a preferred embodiment of the present invention, the combination brush/labyrinth seal is provided in a diaphragm groove. For example, the groove can be formed in an otherwise smooth diaphragm to receive the base portion of a labyrinth tooth. The tooth may have a step which receives one of the bars of the brush seal, while the other bar is received in a recess formed in the diaphragm surface. To secure the combined brush/labyrinth seal in the diaphragm groove, the material of the diaphragm may be peened over the brush/labyrinth seal at circumferentially spaced positions within the groove.

In another embodiment of the present invention, the labyrinth tooth may have a hook fit with the groove in the diaphragm. That is, one or a pair of axial flanges along the base of the labyrinth tooth may project into one or a pair of correspondingly-shaped recess(es) in the groove of the diaphragm. Thus, the combined labyrinth tooth and brush seal may be inserted in a circumferential direction at the midline of the diaphragm, with the edge of the diaphragm being peened along an edge of one of the brush seal bars to retain the labyrinth tooth/brush seal in the diaphragm.

In a preferred embodiment according to the present invention, there is provided in a turbine having a plurality of rotatable buckets with bucket covers and a stationary component surrounding the buckets, a method of forming a seal between the bucket covers and the stationary component, comprising the steps of forming a brush seal having a plurality of bristles extending in a generally common plane and flanked at proximal ends of the bristles by a pair of flexible bars, forming a labyrinth seal tooth segment to a predetermined arc, flexing the brush seal about an axis normal to the common plane to the predetermined arc, forming an annular groove in the stationary component and securing the tooth segment and the brush seal in engagement with one another and in the groove with the bristles engageable with the bucket covers and an edge of the tooth segment closest to the bucket covers being spaced from the covers.

In a further preferred embodiment according to the present invention, there is provided a seal for a turbine, comprising a plurality of rotating buckets including bucket covers and a surrounding stationary component, the stationary component having an annular groove, an arcuate labyrinth seal tooth disposed in the groove, an arcuate brush seal including a plurality of bristles and a pair of arcuate mounting elements on opposite sides of the bristles securing the bristles therebetween along an outer diameter of the brush seal, the brush seal disposed in the groove on the upstream side of the tooth with the tips of the bristles along the inner diameter of the brush seal engaging the bucket covers, the tooth having a step along an upstream face thereof and located in the groove, the step receiving a mounting element of the pair thereof and means for securing the tooth and the brush seal in the groove.

BRIEF DESCRIPTION OF THE DRAWINGS

FIG. 7 is a view illustrating the brush seal bent to two different radii for use in conjunction with two different spill strips of different radii.

DETAILED DESCRIPTION OF THE INVENTION

Figure 1:
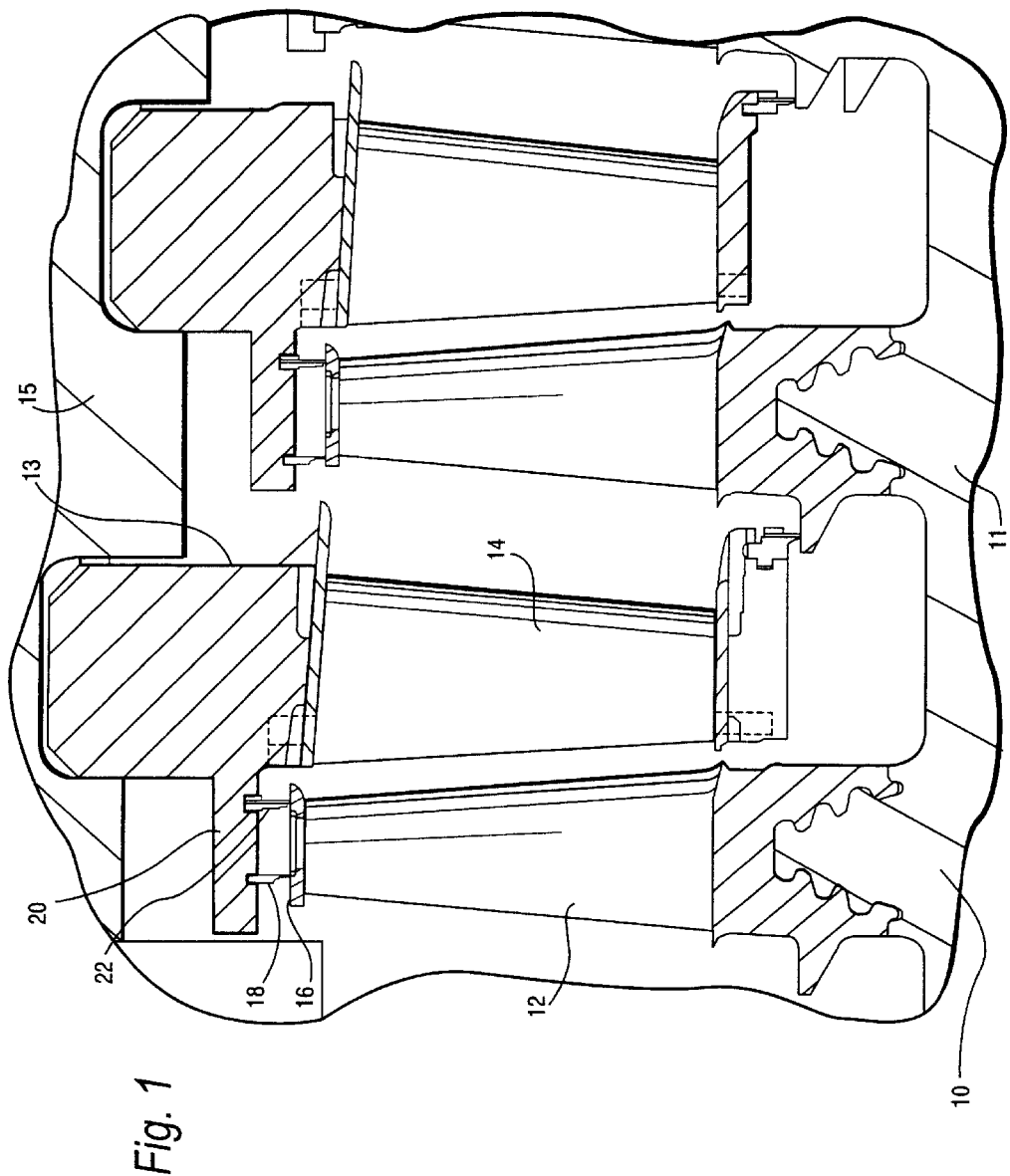
FIG. 1 is a fragmentary cross-sectional view of two turbine stages, each with a brush seal disposed between its diaphragm and bucket cover.

Referring now to the drawings, particularly to FIG. 1, there is illustrated a typical impulse wheel and diaphragm construction for a steam turbine, the impulse wheels 10 forming a rotor 11. Particularly, a plurality of impulse wheels 10 carrying blades 12 alternate in an axial direction with diaphragms 13 carrying nozzle partitions 14, the diaphragm 13 being carried by the casing 15 and sometimes referred to as the stationary component 13. As illustrated, the steam turbine blades 12 mount covers 16 adjacent their tips and seals 18 are provided between the covers 16 and apendages 20 of the diaphragm 13. One of the seals 18 comprises a labyrinth tooth, while the other seal comprises a spill strip/brush or labyrinth tooth/brush seal combination 22 in accordance with a preferred embodiment of the present invention.

Figure 2:
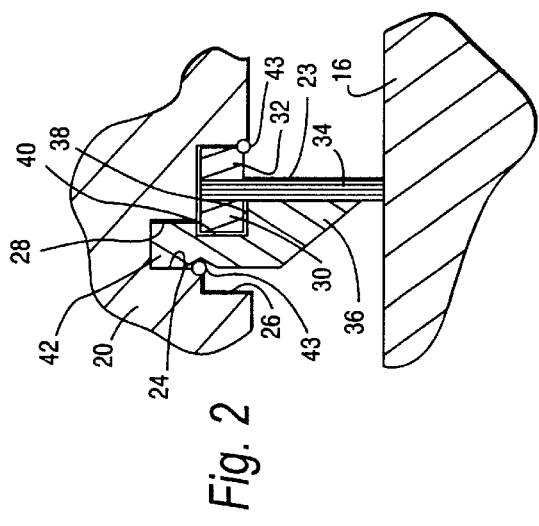

Various forms of the spill strip/brush seal combinations 22 are illustrated in FIGS. 2 through 6. In FIG. 2, the spill strip/brush seal includes a stepped, circumferentially extending annular groove 24 in the stationary component 20, including a shallow groove 26 and a deep groove 28 opening into the shallow groove 26. The brush seal 23 includes a pair of mounting elements, e.g., flexible bars 30 and 32 which straddle proximal ends of bristles 34 formed of a ceramic or metal material. The proximal ends of the bristles 34 are secured to the bars 30 and 32, for example, by welding. The bristles extend from the bars 30, 32 at an angle offset from the radii of the rotor 11 and in the direction of rotation of the rotor to engage bucket covers 16. In accordance with a preferred embodiment hereof, the bars and the bristles disposed between the bars are sufficiently flexible, even after being welded to one another, such that the radii of the brush seal can be changed within a wide range of radii to accommodate different diameters of the stationary component, e.g., the stationary component 20. It will be appreciated that the brush seal 23 is formed of circumferentially extending segments, e.g., typically (but not limited to), six segments each extending through an arc of 60°, and which segments in assembly form a complete annulus.

The spill strip 36 forms a backing plate for the bristles 34 of the brush seal 23 on the downstream side of the seal. The spill strip 36 includes a step 38 in part defining an annular recess 40 along an upstream face for receiving a portion of the brush seal, for example, the bar 30 of the brush seal. The spill strip 36, like the brush seal 23, is preferably formed in circumferentially extending segments which, in assembly, form a complete annulus.

As illustrated, the brush seal 23 is disposed along the upstream side of the shallow groove 26 with the radially outer base 42 of the spill strip 36 disposed in the deep groove 24 of the groove formed in the diaphragm 20. Also, the bar 30 on the downstream side of bristles 34 seats on the step 38 and engages in the recess 40 of the spill strip 36. The shallow groove 26 extends axially sufficient to accommodate both the spill strip 36 and the brush seal while the deep groove 24 accommodates the base of the spill strip 36. Once this groove is formed in the diaphragm either as part of an original equipment manufacture or as a retrofit, the spill strip/brush seal segments are secured to the diaphragm, for example, by peening the diaphragm as at 43 to lock the spill strip/brush seal in place. Other means for securing the spill strip/brush seal to the diaphragm may be utilized such as welding or bolting the spill strip/brush seal to the diaphragm. As illustrated, the spill strip is in the form of a labyrinth tooth having a tapered edge spaced from the bucket cover 16. The tips of the bristles engage the bucket cover 16 as illustrated.

Figure 3:
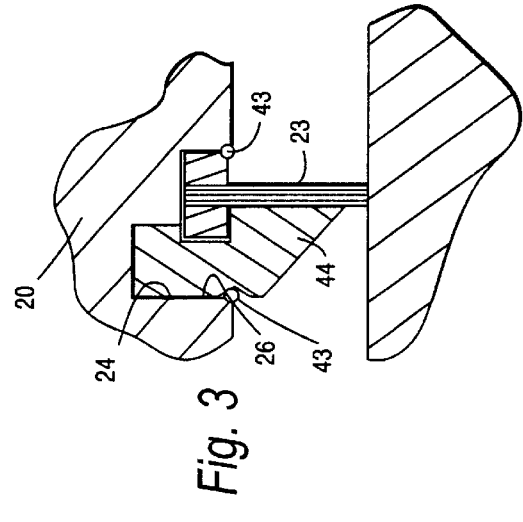
FIGS. 2–6 illustrate various forms of the combined spill strip (labyrinth tooth)/brush seal for disposition in the diaphragm.

Referring to FIG. 3, the illustrated spill strip/brush seal is substantially similarly configured, as the spill strip/brush seal illustrated in FIG. 2. In this form, however, the spill strip 44 has a thicker axial dimension and the downstream wall of the deep groove 24 is coextensive with the downstream wall of the shallow groove 26. With the spill strip 44 and brush seal 23 disposed circumferentially in the annular groove 24 formed in the diaphragm 20, the seal is secured by peening along the margins of the groove, e.g., at 43.

Figure 4:
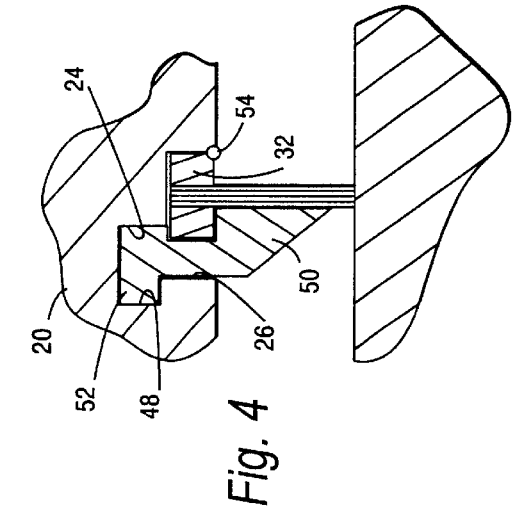

Referring to FIG. 4, the deep recess 24 of the diaphragm 20 has a recess 48 extending in an axial downstream direction from the axially downstream wall of the shallow groove 26. The spill strip 50 has a radially outer base portion generally complementary in shape to the deep groove 24, i.e., a downstream extending flange or hook 52. By applying the combined spill strip/brush seal circumferentially within the annular groove 24 of the diaphragm 20, the hook 52 is received in the complementary deep groove 28 (FIG. 2) including extension 48. By peening the axially upstream edge of the diaphragm at 54 against the bar 32 on the upstream side of bristles 34, the spill strip/brush seal is retained within the diaphragm groove.

Figure 5:
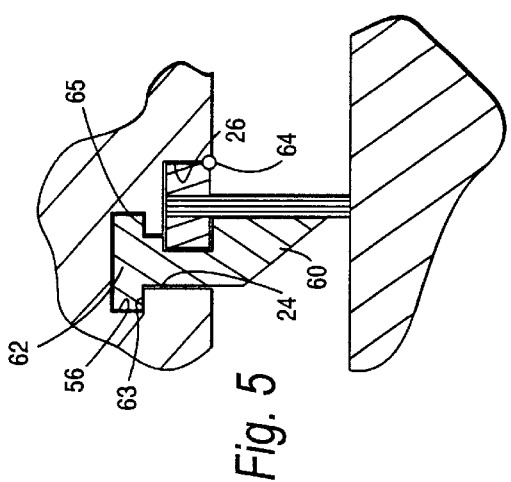

Referring to FIG. 5, the deep groove 56 has a generally T-shaped configuration having axially extending recesses 63 and 65 with the leg of the groove opening into and forming a portion of the shallow groove 26. The spill strip 60 includes a generally T-shaped base portion 62 complementary in shape to the deep groove 56 including the recesses 63 and 65. By sliding the spill strip/brush seal circumferentially into the annular groove 24 of the diaphragm 20 and peening the margin of the groove along the axial upstream portion into the brush seal bar 32 (FIGS. 2, 4) at 64, the seal is retained in the diaphragm.

Figure 6:
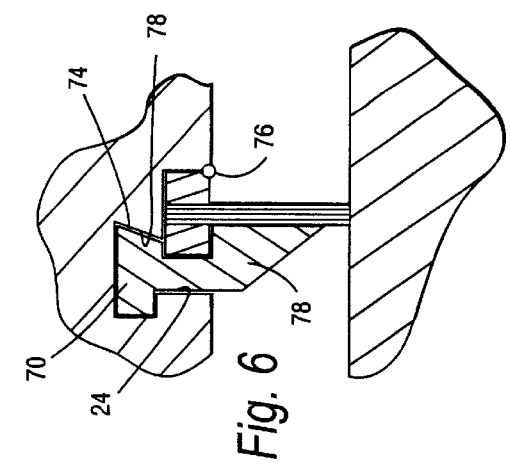

Referring to FIG. 6, the spill strip/brush seal is similar to that of FIG. 5, except that the upstream edge of the generally T-shaped base portion 70 of the spill strip 72 has an inclined surface 74. The deep groove 56 (FIG. 5) has a correspondingly-shaped or complementary inclined surface 78. Upon circumferential displacement of the spill strip/brush seal into the groove, the seal is secured by peening the axially upstream margin of the groove against the bar 32 of the brush seal as at 76.

Referring now to FIG. 7, the brush seal formed of the bars 30, 32 and bristles 34 is sufficiently flexible in a radial direction for use with spill strips and annular diaphragm grooves of varying diameters over a wide range of diameters. To accomplish this, the bars 30 and 32 have a thickness dimension in the radial direction which is relatively thin such that the brush seal can be flexed in a radial direction to accommodate the differing diameters. Thus, for example, a diaphragm having a 40" diameter, as well as a diaphragm having, for example, a 36" diameter, can be accommodated by the same brush seal. It will be appreciated that the spill strip, however, must be fabricated for each specific diameter. Consequently, the brush seals can be fabricated in advance of any anticipated use, and are used with spill strips of different diameters. This reduces the manufacturing cycle time.

As an illustrative example of the foregoing, there is illustrated in FIG. 7 a spill strip 80 having a predetermined diameter, for example, 40 inches. The brush seal comprising bars 30, 32 and bristles 34 is flexed in a radial direction such that its diameter corresponds to the diameter of the spill strip 18 (FIG. 1). Consequently, as illustrated, the brush seal is conformable to the diameter of the spill strip 80. As illustrated by the dashed lines of the brush seal in the upper portion of FIG. 7, the brush seal is, however, flexible to different diameters, for example, to a 36-inch diameter. Accordingly, the brush seal can be flexed to the smaller diameter and employed with the spill strip 82 of that smaller diameter, as illustrated in the lower portion of FIG. 7. Thus, the brush seal is sufficiently flexible for use with spill strips or labyrinth teeth of different diameters. Because the brush seals are sufficiently flexible for use in different diameters of spill strips or labyrinth teeth, the brush seals can be fabricated in advance of their actual need and, consequently, the manufacturing cycle time, for example, for retrofitting a brush seal into a diaphragm can be substantially reduced by having on hand the brush seal portion of the spill strip/brush seal being retrofitted into the diaphragm.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having a plurality of rotatable buckets with bucket covers and a stationary component surrounding the buckets, a method of forming a seal between the bucket covers and the stationary component, comprising the steps of:

forming a brush seal having a plurality of bristles extending in a generally common plane and flanked at proximal ends of the bristles by a pair of flexible bars;

forming a labyrinth seal tooth segment to a predetermined arc;

flexing the brush seal about an axis normal to said common plane to said predetermined arc;

forming an annular groove in said stationary component; and securing said tooth segment and said brush seal in engagement with one another and in said groove with said bristles engageable with the bucket covers and an edge of said tooth segment closest to said bucket covers being spaced from said covers.

2. A method according to claim 1 including forming deep and shallow annular grooves in said stationary component, with said deep groove opening radially into said shallow groove, providing the labyrinth seal tooth segment with a base portion receivable in said deep and shallow annular grooves, providing a recess along a face of said tooth segment for receiving at least a portion of said brush seal, and advancing said brush seal and said tooth segment in a circumferential direction in said annular groove into final position in said stationary component.

3. A method according to claim 2 wherein the step of securing includes peening one of the materials of said stationary component and said tooth segment to secure the tooth segment and brush seal in said annular groove.

4. A method according to claim 2 including locating said tooth segment in said annular groove on a downstream side of said brush seal such that said tooth forms a backing for said bristles.

5. A method according to claim 1 including forming a recess along a face of said tooth segment and engaging one of said bars at least in part in said recess.

6. A method according to claim 5 including locating said bars substantially wholly in the shallow groove of said stationary component.

7. A method according to claim 6 wherein the step of securing includes peening one of the materials of said stationary component and said tooth segment to secure the tooth segment and brush seal in said groove.

8. A method according to claim 6 wherein the step of securing includes peening one of the materials of said stationary component.

9. A seal for a turbine, comprising:

a plurality of rotating buckets including bucket covers and a surrounding stationary component, said stationary component having an annular groove;

an arcuate labyrinth seal tooth disposed in said groove;

an arcuate brush seal including a plurality of bristles and a pair of arcuate mounting elements on opposite sides of said bristles securing said bristles therebetween along an outer diameter of the brush seal;

said brush seal disposed in said groove on the upstream side of said tooth with the tips of said bristles along the inner diameter of said brush seal engaging the bucket covers, said tooth having a step along an upstream face thereof and located in said groove, said step receiving a mounting element of said pair thereof;

means for securing said tooth and said brush seal in said groove;

said stationary component having a circular face through which said groove is formed, said pair of mounting elements lying wholly within said groove; and said tooth including a recess, said step forming part of said recess, and said mounting elements and said recess lying wholly within said groove.

10. A seal according to claim 9 wherein said securing means includes portions of said stationary component peened into another of said mounting elements of said pair thereof.

11. A seal for a turbine, comprising:

a plurality of rotating buckets including bucket covers and a surrounding stationary component, said stationary component having an annular groove;

an arcuate labyrinth seal tooth disposed in said groove;

an arcuate brush seal including a plurality of bristles and a pair of arcuate mounting elements on opposite sides of said bristles securing said bristles therebetween along an outer diameter of the brush seal;

said brush seal disposed in said groove on the upstream side of said tooth with the tips of said bristles along the inner diameter of said brush seal engaging the bucket covers, said tooth having a step along an upstream face thereof and located in said groove, said step receiving a mounting element of said pair thereof;

means for securing said tooth and said brush seal in said groove; and said groove in said stationary component having an axial recess, said tooth having an axially extending flange engaged in said recess.

12. A seal according to claim 11 wherein said stationary component has a circular face through which said groove is formed, said pair of mounting elements lying wholly within said groove.

13. A seal for a turbine, comprising:

a plurality of rotating buckets including bucket covers and a surrounding stationary component, said stationary component having an annular groove;

an arcuate labyrinth seal tooth disposed in said groove;

an arcuate brush seal including a plurality of bristles and a pair of arcuate mounting elements on opposite sides of said bristles securing said bristles therebetween along an outer diameter of the brush seal;

said brush seal disposed in said groove on the upstream side of said tooth with the tips of said bristles along the inner diameter of said brush seal engaging the bucket covers, said tooth having a step along an upstream face thereof and located in said groove, said step receiving a mounting element of said pair thereof;

means for securing said tooth and said brush seal in said groove; and said groove in said stationary component having a pair of recesses extending axially away from one another forming a generally T-shaped configuration within said groove, said tooth having a generally complementary T-shaped base portion received within said groove and recesses.

* * * * *

UNITED STATES PATENT AND TRADEMARK OFFICE
CERTIFICATE OF CORRECTION

PATENT NO.     : 6,431,827 B1
DATED          : August 13, 2002
INVENTOR(S)    : Wolfe et al.

It is certified that error appears in the above-identified patent and that said Letters Patent is hereby corrected as shown below:

<u>Column 2,</u>
Line 26, delete "brush seal" and insert -- flexible --

Signed and Sealed this

Fourteenth Day of January, 2003

JAMES E. ROGAN
*Director of the United States Patent and Trademark Office*